(12) United States Patent
Freyermuth et al.

(10) Patent No.: US 12,303,977 B2
(45) Date of Patent: May 20, 2025

(54) MEANS FOR RECEIVING POWDER IN AN ADDITIVE MANUFACTURING MACHINE

(71) Applicant: SAFRAN LANDING SYSTEMS, Vélizy-Villacoublay (FR)

(72) Inventors: Alain Freyermuth, Moissy-Cramayel (FR); Denis Luttenbacher, Moissy-Cramayel (FR); Vincent Royer, Moissy-Cramayel (FR)

(73) Assignee: SAFRAN LANDING SYSTEMS, Vélizy-Villacoublay (FR)

( * ) Notice: Subject to any disclaimer, the term of this patent is extended or adjusted under 35 U.S.C. 154(b) by 139 days.

(21) Appl. No.: 18/250,881

(22) PCT Filed: Oct. 26, 2021

(86) PCT No.: PCT/FR2021/051881
§ 371 (c)(1),
(2) Date: Apr. 27, 2023

(87) PCT Pub. No.: WO2022/090663
PCT Pub. Date: May 5, 2022

(65) Prior Publication Data
US 2023/0381865 A1 Nov. 30, 2023

(30) Foreign Application Priority Data
Oct. 28, 2020 (FR) ...................................... 2011015

(51) Int. Cl.
*B29C 64/259* (2017.01)
*B22F 10/28* (2021.01)
(Continued)

(52) U.S. Cl.
CPC .............. *B22F 12/52* (2021.01); *B22F 10/28* (2021.01); *B22F 12/38* (2021.01); *B29C 64/153* (2017.08);
(Continued)

(58) Field of Classification Search
CPC ........................... B29C 64/153; B29C 64/165
See application file for complete search history.

(56) References Cited

U.S. PATENT DOCUMENTS 9,457,514 B2 * 10/2016 Schwärzler ............. B29C 64/40
9,475,234 B2 * 10/2016 Morikawa ............... B29C 64/35
(Continued)

FOREIGN PATENT DOCUMENTS

DE        102015012647 A1 * 3/2017 ........... B29C 64/255
WO     WO 2019/094276 A1    5/2019

OTHER PUBLICATIONS

International Search Report as issued in International Patent Application No. PCT/FR2021/051881, dated Dec. 21, 2021.

*Primary Examiner* — Atul P. Khare
(74) *Attorney, Agent, or Firm* — Pillsbury Winthrop Shaw Pittman LLP

(57) ABSTRACT

An additive manufacturing machine includes a system for receiving powder, including four sides: a right-hand partition and a left-hand partition, a front partition and a rear partition, wherein at least two opposite sides each includes two hinged portions allowing the folding of the sides. The system is foldable and can be easily placed in the melt chamber without interfering with the manufacturing process; it can therefore be placed in the chamber before manufacturing.

10 Claims, 4 Drawing Sheets

(51) Int. Cl.
*B22F 12/00* (2021.01)
*B22F 12/52* (2021.01)
*B29C 64/153* (2017.01)
*B29C 64/25* (2017.01)
*B33Y 30/00* (2015.01)

(52) U.S. Cl.
CPC ............ *B29C 64/25* (2017.08); *B29C 64/259* (2017.08); *B33Y 30/00* (2014.12)

(56) References Cited

U.S. PATENT DOCUMENTS

| | | | |
|---|---|---|---|
| 10,143,321 B2 * | 12/2018 | Hippert | A47G 29/20 |
| 11,458,682 B2 * | 10/2022 | Karlsson | B33Y 50/02 |
| 11,491,720 B2 * | 11/2022 | Jordan | B29C 64/165 |
| 2017/0246808 A1 | 8/2017 | Höchsmann et al. | |
| 2019/0009338 A1 | 1/2019 | McMurtry et al. | |

* cited by examiner

[Fig. 1]
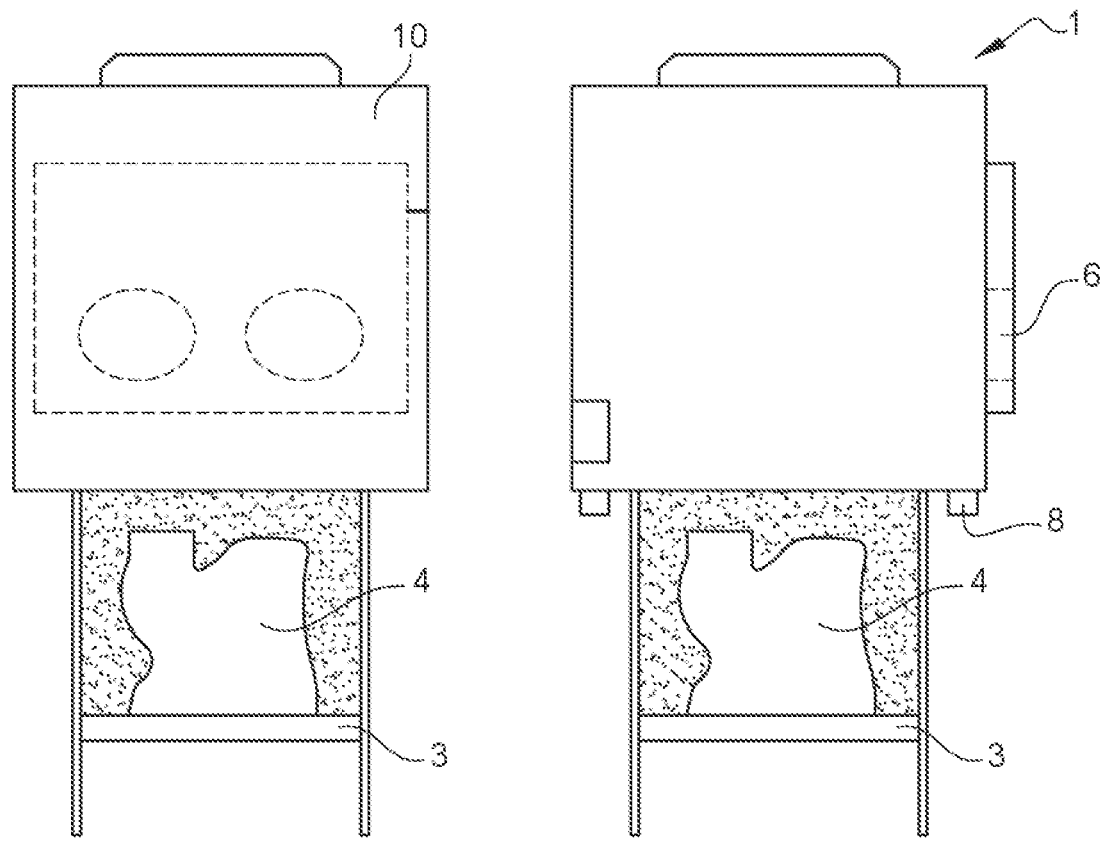
[Fig. 2]
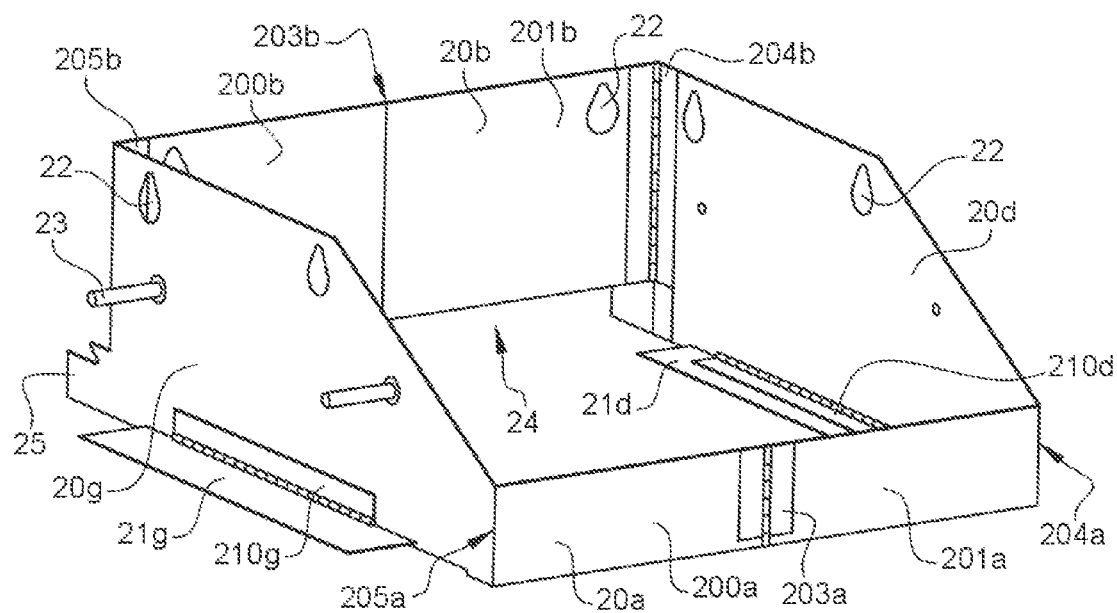

[Fig. 3]
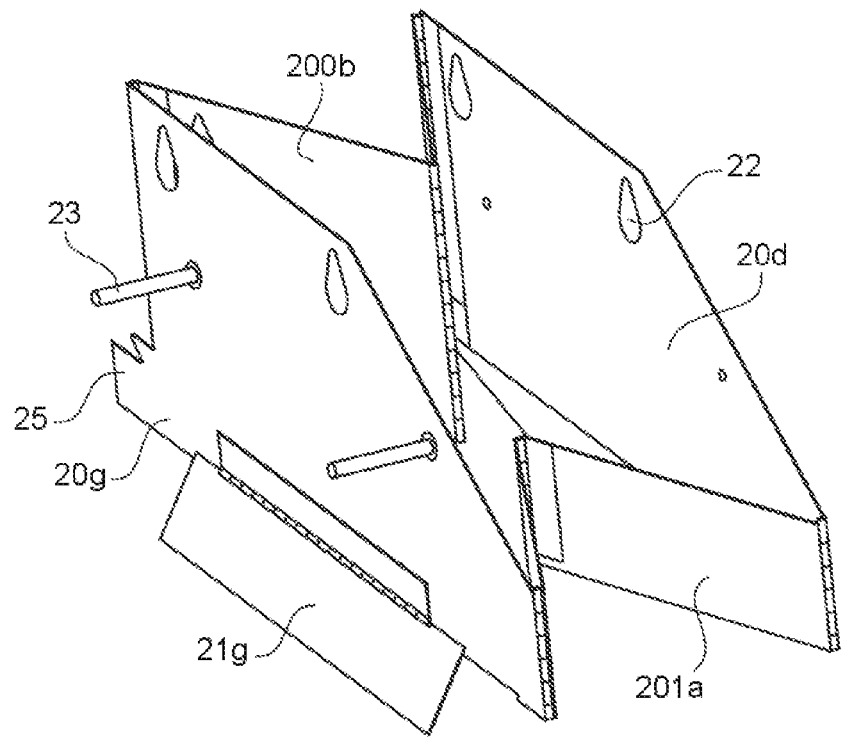
[Fig. 4]
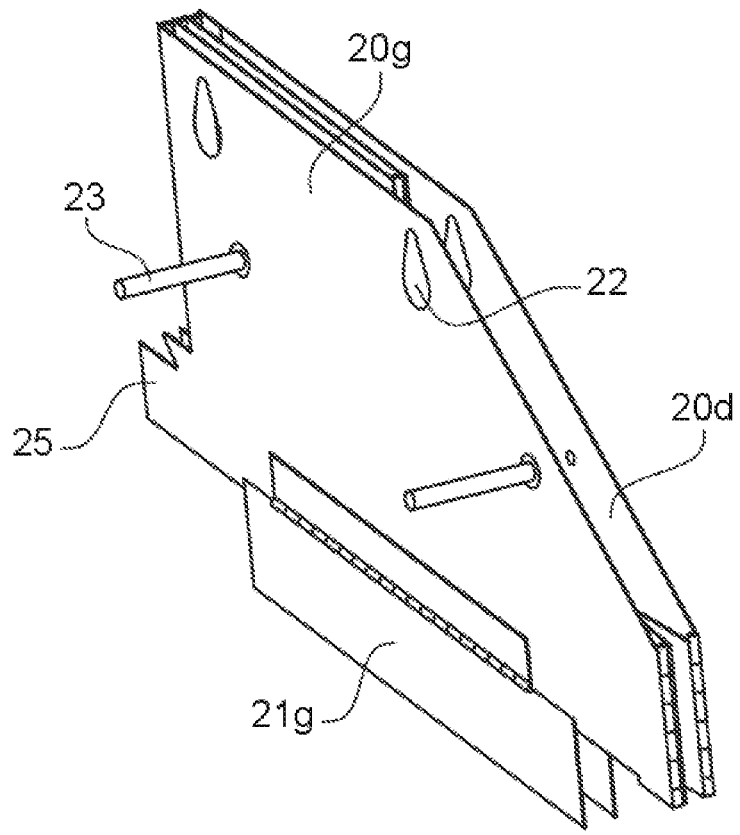

[Fig. 5]
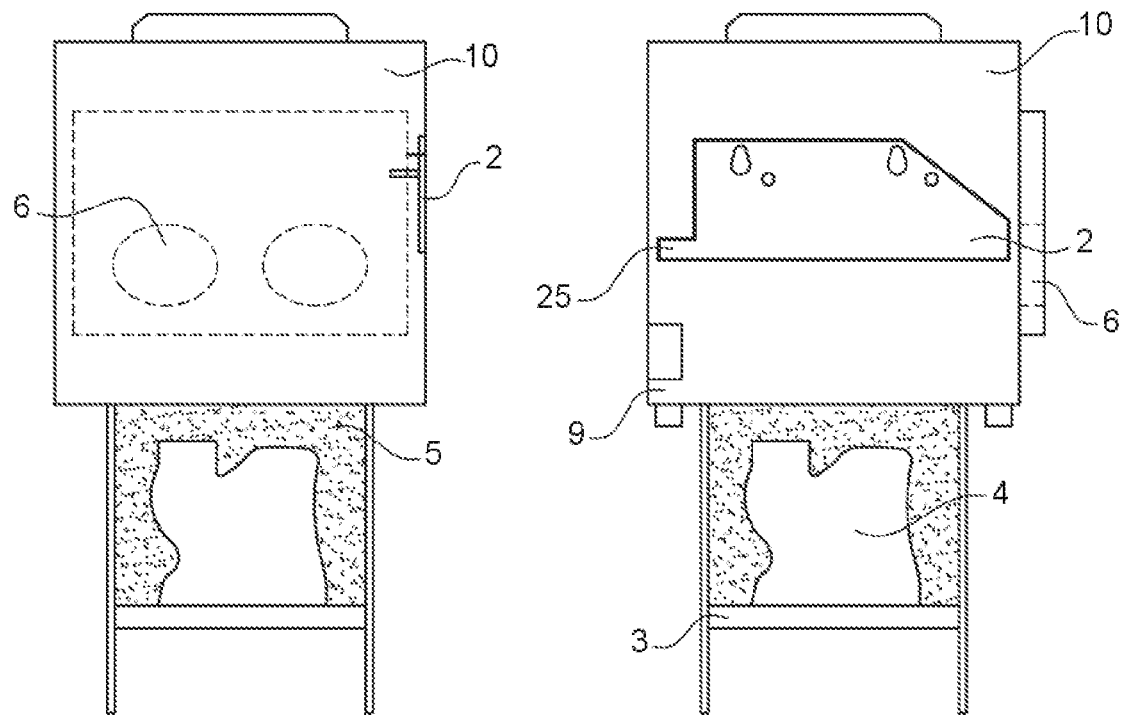
[Fig. 6]
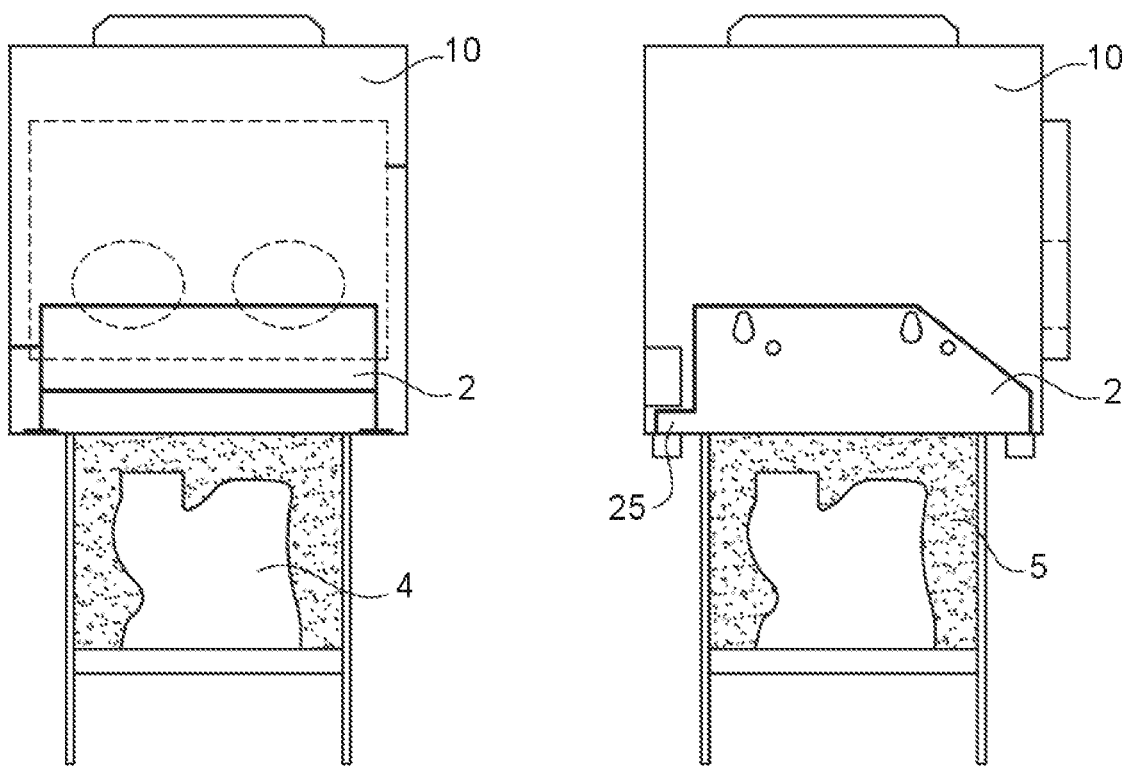

[Fig. 7]
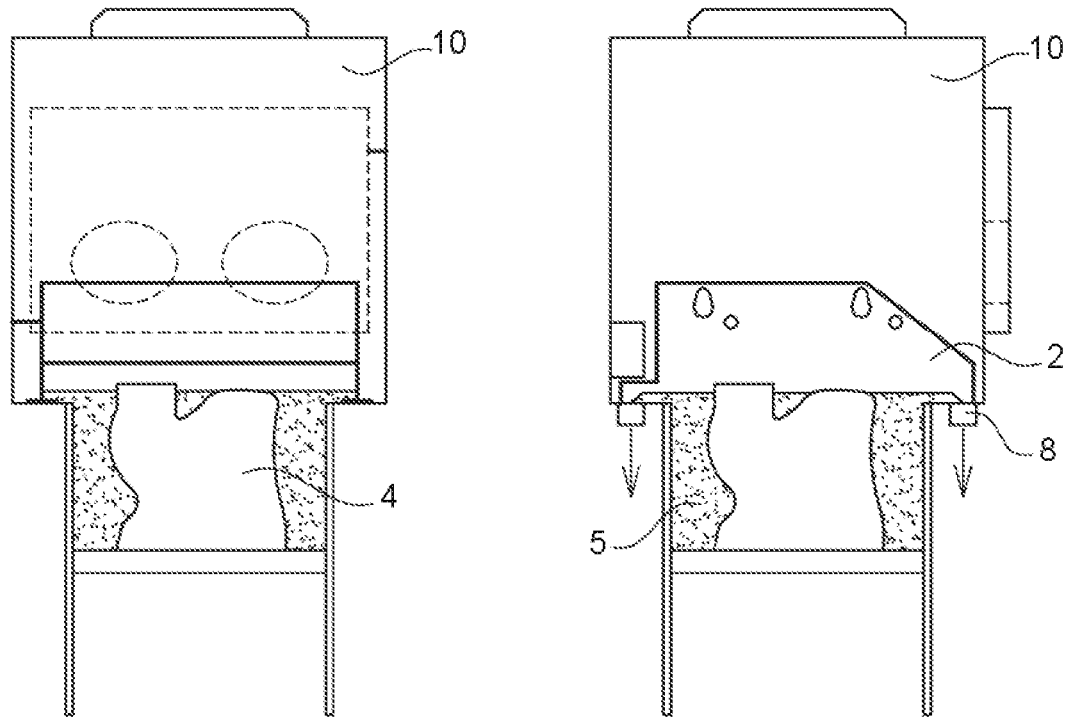
[Fig. 8]
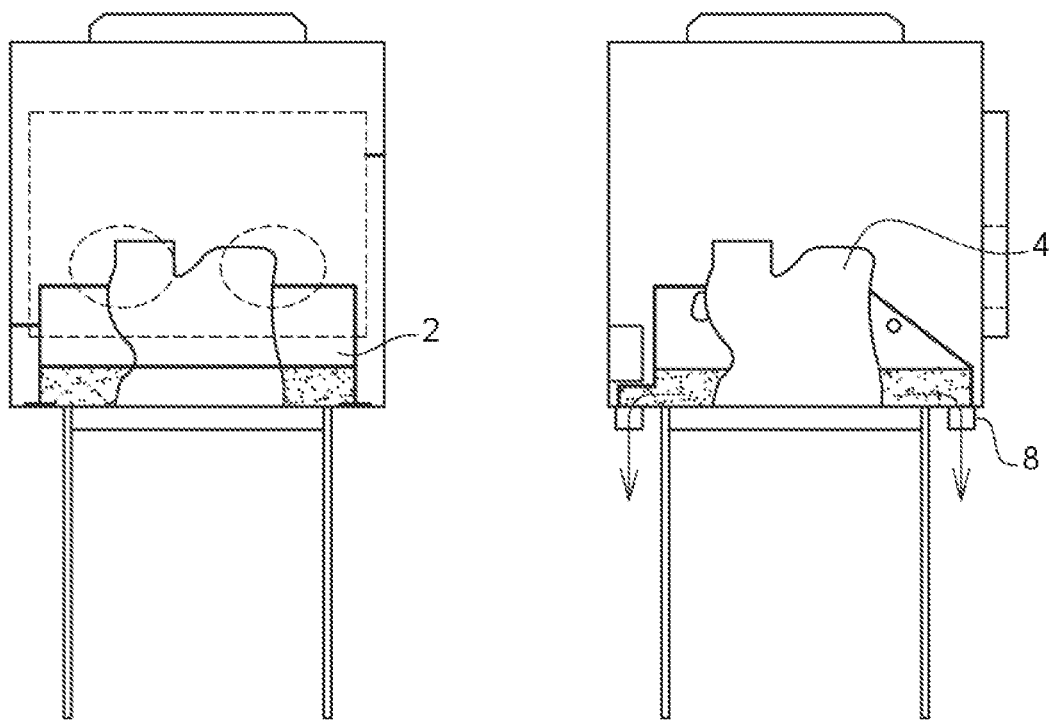

MEANS FOR RECEIVING POWDER IN AN ADDITIVE MANUFACTURING MACHINE

CROSS-REFERENCE TO RELATED APPLICATIONS

This application is the U.S. National Stage of PCT/FR2021/051881, filed Oct. 26, 2021, which in turn claims priority to French patent application number 2011015 filed Oct. 28, 2020. The content of these applications are incorporated herein by reference in their entireties.

TECHNICAL FIELD OF THE INVENTION

The technical field of the invention is that of additive manufacturing machines and more particularly those using thermal energy (laser or electron beam) to melt and fuse particles in well-defined regions of a bed of powders and more particularly metal powders.

TECHNOLOGICAL BACKGROUND OF THE INVENTION

In additive manufacturing machines, thin layers of powders, or beds, are deposited one by one, each one attached on the previous ones by a laser beam, wherein a powder spreading system consisting of a scraper successively spreads each layer of powders as the piece advances.

Once the piece has been manufactured, the tray on which it is built is found at the bottom of a well, embedded in the powder that has not been solidified. As the whole assembly is raised in temperature for reasons of stress limitation upon fusing the powders, it is necessary to wait for some time before being able to access and remove the piece on its tray from the machine, all the more so as it is impossible to open the machine door as long as the temperature of the chamber has not fallen below a defined safety threshold.

For obvious productivity reasons, the objective is to remove the finished piece as quickly as possible so that the next one can be produced.

It is possible, in order to accelerate cooling, to remove as much of the powder around the fused piece as possible in order to limit the mass to be cooled. It is therefore necessary to raise the table supporting the fusion tray and therefore the fused piece, but the non-solidified powder will spill into the machine enclosure, flooding it in a way. This is unacceptable and therefore prohibited.

It has been proposed to place a frame in the chamber in order to prevent the powder from spilling out uncontrollably, however the overall size of this device is important. As the volume of the fusion chamber is restricted, the storage of large pieces in the facility enclosure during the manufacturing phase is not permitted. It is therefore not possible to use this frame until the temperature of the piece reaches a level below that which allows the chamber to be opened.

Moreover, since kinematics for setting up such a device is complex, there is no time saving on cooling the piece manufactured.

SUMMARY OF THE INVENTION

The invention provides a solution to the problems previously discussed, by providing an additive manufacturing machine with a means of receiving powders which makes it possible to limit spillage of powders into the fusion chamber, to contain these powders and to guide them towards the spillways. Since this means can be integrated into the enclosure of the fusion chamber, it does not prevent or hinder the manufacturing process of the piece and makes it possible to reduce cooling time of the piece and thus to reduce duration of the manufacturing cycle time of the piece.

The additive manufacturing machine according to the invention is characterised in that it comprises a means for receiving unfused powders comprising four sides: a right-hand partition and a left-hand partition, a front partition and a rear partition, it is characterised in that at least two opposite sides each consist of two hinged parts allowing folding of said sides. As the means is foldable, it is easy to place in the chamber of the fusion chamber without hindering manufacture. All that is required is to manually unfold it via an opening, such as a glove box, to be able to use it when the tray raises with the piece and the unfused powder. The unfused powder will then be quickly and safely discharged, allowing the piece to cool more quickly.

Folding can be done with two front metal sheets and two rear metal sheets of the front and rear partitions or on the side, right-hand and left-hand, partitions in which case the front and rear partitions would become solid, the side ones would thus be in the form of hinged half partitions in order to always ensure folding.

Advantageously, the front partition is smaller in height than the rear partition. The unfused powder is thus directed frontwardly.

Advantageously, two hinged shoes are placed on each of the right-hand and left-hand partitions. These two bottom hinged shoes serve as a spacer and as a support for the ballast by the force exerted by the mass of unfused powder flowing out of the fusion volume when the table supporting the tray and the piece is raised.

Advantageously, at least one of the right or left-hand partitions comprises a hooking means. This hooking means serves to store the receiving means and may incorporate a specific shape on the rear side adapted to the configuration of the additive manufacturing machine.

Advantageously, the hinged parts and/or the hinged shoes are made with piano type full length hinges. These hinges ensure proper tightness of the means.

Advantageously, folding is carried out inwardly and symmetrically. The overall size of the receiving means, when folded, is thus limited.

Advantageously, the rear partition comprises a bottom opening. This opening allows the unfused powders to be discharged. The characteristics of this opening, such as its height, are related in a non-exhaustive manner to one or more parameters such as the avalanche angles, dynamic angles of repose of the powder, and distance to the spillway.

Advantageously, the right-hand and left-hand partitions comprise a rear positioning device. By way of example, this may be made by a protrusion in prismatic form which is inserted into a housing inside the fusion chamber of the machine.

Advantageously, one of the right or left-hand partitions comprises a side positioning device. For example, this positioning device could consist of a rod or through shoes adapted for the purpose.

The invention also relates to an additive manufacturing machine comprising a means for receiving unfused powders according to at least one of the preceding characteristics.

BRIEF DESCRIPTION OF THE FIGURES

The figures are set forth by way of indicating and in no way limiting purposes of the invention.

FIG. 1 is a front and side view of an additive manufacturing machine of the state of the art;

FIG. 2 is a perspective view of the powder receiving means according to the invention in an open position;

FIG. 3 is a perspective view of the powder receiving means according to the invention in a semi-closed position;

FIG. 4 is a perspective view of the powder receiving means according to the invention in a closed position;

FIG. 5 is a front and profile view of an additive manufacturing machine according to the invention with the receiving means in a folded position;

FIG. 6 is a front and profile view of an additive manufacturing machine according to the invention with the receiving means in the open position;

FIG. 7 is a front and profile view of an additive manufacturing machine according to the invention with the receiving means in the open position with the table being raised;

FIG. 8 is a front and profile view of an additive manufacturing machine according to the invention with the receiving means in position with the table completely raised.

DETAILED DESCRIPTION

The figures are set forth by way of indicating and in no way limiting purposes of the invention.

Unless otherwise specified, a same element appearing in different figures has a single reference.

Throughout the description, the face of the powder-receiving means that is in front in the perspective views of FIGS. 2 to 4 will be referred to as the "front" face and the face that is behind in the same perspective views will be referred to as the "rear" face. The right side will correspond to the right-hand side of these figures and the left side to the left-hand side of the same figures.

The additive manufacturing machine 1, illustrated in FIG. 1, comprises a fusion chamber 10 in which a tray 3 is disposed on which a piece 4 is made by additive manufacturing. The fusion chamber 10 constitutes a restricted enclosure, accessible through an opening 6.

The tray 3 will descend as the various layers are successively made until the piece 4 is completely made. The unfused powder 5 will remain on the tray 3 throughout the manufacture of the piece 4.

When the piece 4 is finished, the tray 3 has to be raised and during this raising the unfused powder 5 will tend to spill over the sides, but the positioning of the powder receiving means 2 according to the invention, visible in FIGS. 5 to 8, will make it possible to channel these powders.

The powder receiving means 2 comprises four partitions: a right-hand partition 20d and a left-hand partition 20g, a front partition 20a and a rear partition 20b.

The front partition 20a is lower than the rear partition 20b in order to access the powders 5 through the opening 6. The front partition 20a has an opening 24 at the bottom to allow powder 5 to be discharged by gravity to powder recovery devices 8.

The front partition 20a is in the form of two half partitions 200a and 201a hinged together through a hinge 203a, and hinged at the right end to the right-hand partition 20d through a hinge 204a and at the left end to the left-hand partition 20g through a hinge 205a.

Similarly, the rear partition 20b is in the form of two half partitions 200b and 201b hinged together through a hinge 203b, and hinged at the right end to the right-hand partition 20d through a hinge 204b and at the left end to the left-hand partition 20g through a hinge 205b.

The right-hand and left-hand partitions 2d and 2g each support a hinged shoe 21d and 21g in their lower part through a hinge 210d and 210g. These shoes 21d and 21g ensure stabilisation by pressure of the mass of powder 5 which is spilled thereover and prevent said means from lifting. The shoes 21d and 21g are manually folded.

The partitions have hooking means 22 allowing storage of said receiving means 2 in the chamber 10 in a zone that does not interfere with the production device(s) for the machine.

The left-hand partition 20g has radial positioning devices 23 in the form of rods. One of the shoes (here 21g) may also serve as a positioning device.

The hinges 204a, 204b and 205a, 205b are reversed with respect to the hinges 203a and 203b respectively, allowing them to be folded inwardly. The hinges 203a, 203b, 204a, 204b, 205a, 205b, 210g and 210d are so-called "piano" hinges.

The right-hand and left-hand partitions 20d and 20g have a depth positioning device consisting of a protrusion 25 in prismatic form which is inserted into a housing 9 placed inside the fusion chamber 10 of the additive manufacturing machine 1.

The operation of the powder receiving means 2 will now described.

The powder receiving means 2 is positioned folded in the fusion chamber 10 above the tray 3, before and during the manufacture of the piece 4, in a zone which does not interfere with the production device(s) for the machine, as for example on one of the sides of the chamber (cf. FIG. 5).

Once the manufacture of the piece 4 is complete, as visible in FIG. 6, the receiving means 2 is manually unfolded through the opening 6, laid and positioned in depth on the tray 3 by virtue of the insertion of the protrusion 25 into the housing 9. The tray 3 is raised with the piece and the unfused powder 5. The unfused powder 5 will be distributed in the receiving means 2 and will then be discharged by gravity or using tooling initially placed in the manufacturing chamber, such as a brush, via the powder recovery devices 8, until the unfused powder 5 is completely discharged and the piece 4 is cleared, as illustrated in FIGS. 7 and 8.

Unlike a system that could be described as rigid, since the receiving means 2 is already positioned in the chamber 10, it is no longer necessary to wait for the temperature limit setpoint for access to the fusion chamber 10 to be able to install said means in order to raise the tray 3 and cause discharge of the powders 5 towards the powder recovery devices 8, hence saving time and thus improving the use of the additive manufacturing machine 1.

The invention claimed is:

1. An additive manufacturing machine comprising a means for receiving unfused powders comprising four sides respectively defined by opposing right-hand and left-hand partitions, all and opposing front and rear partitions, wherein at least two opposite sides of the four sides each consists of two hinged parts allowing folding of said at least two opposite sides, and wherein said means for receiving unfused powders is configured to be integrated into an enclosure of a fusion chamber of the additive manufacturing machine.

2. The additive manufacturing machine according to claim 1, wherein the front partition is smaller in height than the rear partition.

3. The additive manufacturing machine according to claim 1, wherein two hinged shoes are placed on each of the right-hand and left-hand partitions.

4. The additive manufacturing machine according to claim 3, wherein the hinged shoes are made with piano type full length hinges.

5. The additive manufacturing machine according to claim 1, wherein at least one of the right-hand or left-hand partitions comprises a hooking means.

6. The additive manufacturing machine according to claim 1, wherein the hinged parts are made with piano type full length hinges.

7. The additive manufacturing machine according to claim 1, wherein the folding is carried out inwardly and symmetrically.

8. The additive manufacturing machine according to claim 1, wherein the rear partition comprises an opening at the bottom thereof.

9. The additive manufacturing machine according to claim 1, wherein the right-hand and left-hand partitions comprise a rear positioning device.

10. The additive manufacturing machine according to claim 1, wherein one of the right-hand or left-hand partitions comprises a side positioning device.

* * * * *